June 28, 1932.  W. S. HOWARD  1,865,318
SELF LOADING VEHICLE
Filed Sept. 11, 1929   6 Sheets-Sheet 3

INVENTOR
William S. Howard
BY
Emery, Booth, Varney & Whittemore
ATTORNEYS

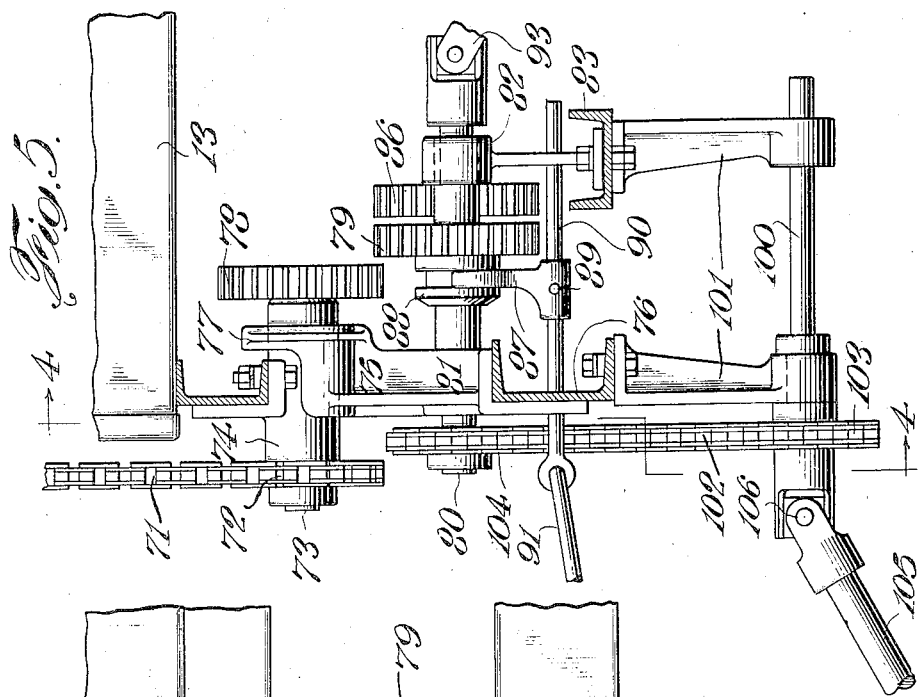

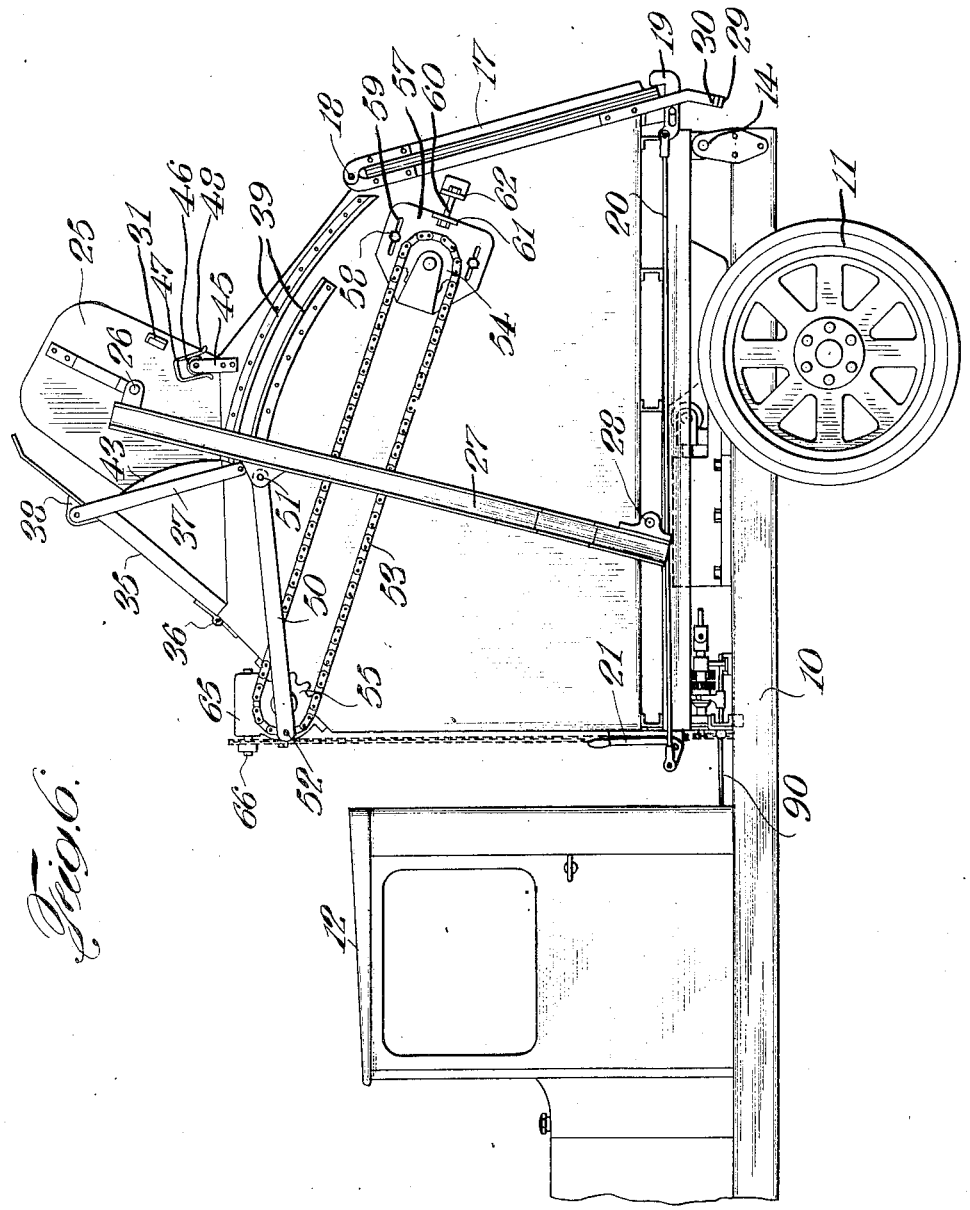

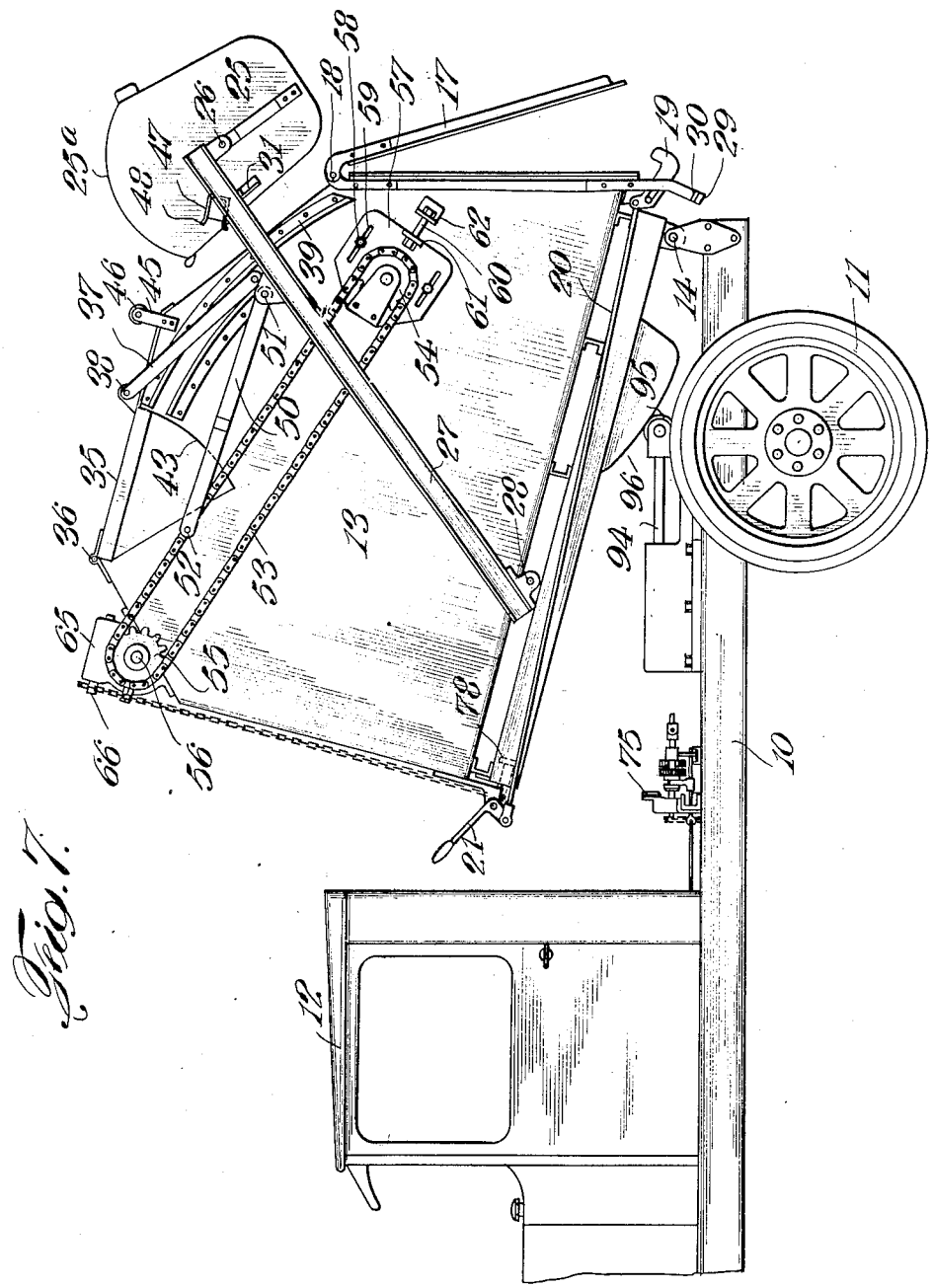

Patented June 28, 1932

1,865,318

UNITED STATES PATENT OFFICE

WILLIAM S. HOWARD, OF NEW YORK, N. Y., ASSIGNOR TO COLLECTION EQUIPMENT CORPORATION, OF NEW YORK, N. Y., A CORPORATION OF DELAWARE

SELF-LOADING VEHICLE

Application filed September 11, 1929. Serial No. 391,710.

This invention relates to self-loading vehicles and has for an object the improvement of such vehicles. More particularly the objects of the invention are the provision in an enclosed sanitary self-loading vehicle of loading mechanism which is simple, substantial, reliable in operation, and which is durable in service.

The enumerated and other objects as well as various novel features of the invention will be apparent from a description of an exemplary embodiment thereof, reference being made to the accompanying drawings, in which:

Figure 4 is a section taken on line 4—4 of Figure 5 and showing in enlargement portions seen in Figure 3;

Figure 5 is a right side elevation of Figure 4;

Figure 6 is a view similar to Figure 1 but showing the parts in another position; and Figure 7 is a similar view showing the position of parts when the body is tilted for dumping.

Figure 1:
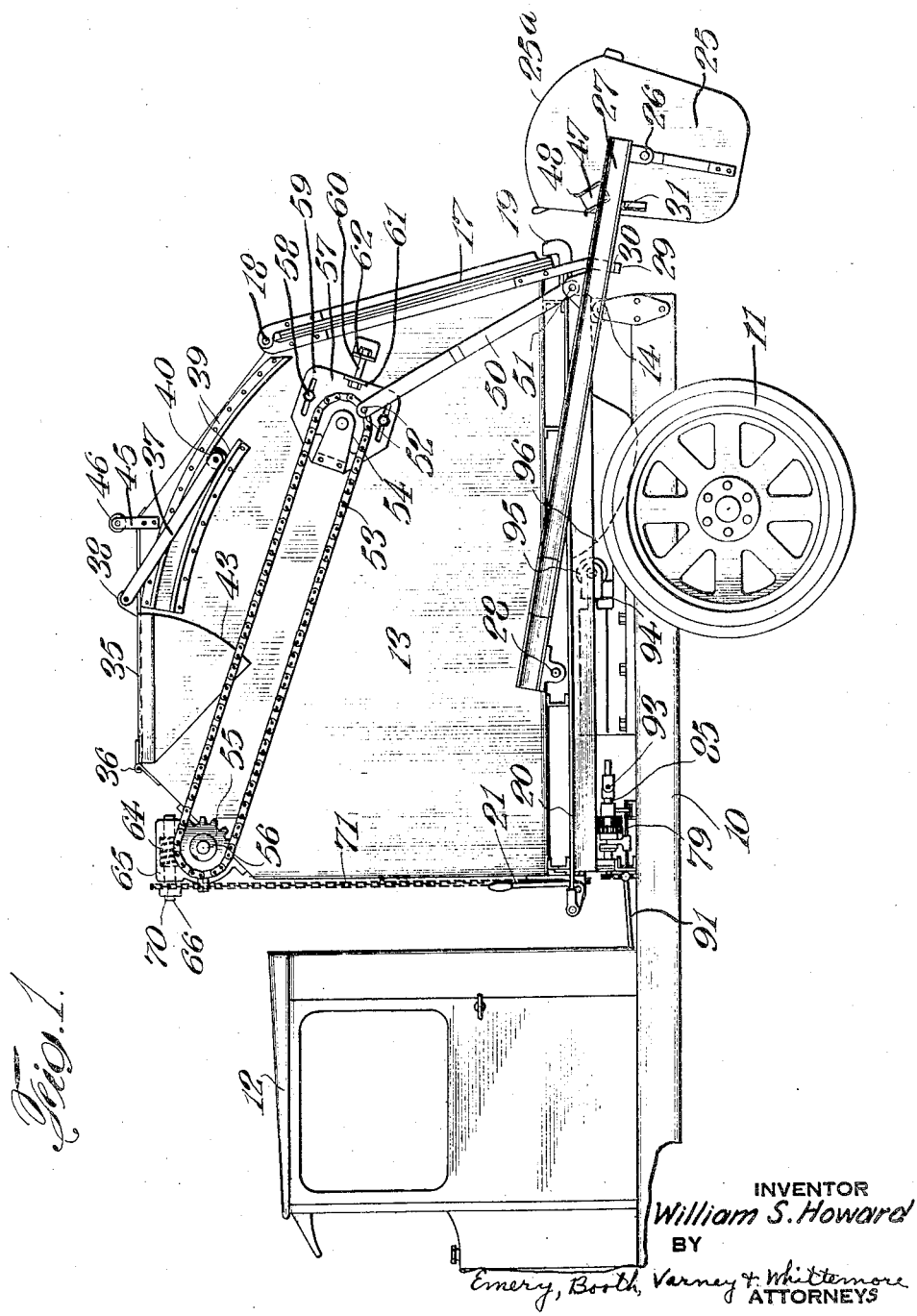
Figure 1 is a left side elevation of a truck and associated apparatus embodying the present invention.

In the drawings, the chassis 10 is supported on wheels 11, of which only the rear wheels are shown. Behind the driver's cab 12 a dump body 13 is mounted, preferably being tiltably connected at each side near its rear end to the rear end of the chassis frame by hinges 14. On account of the violent road weave to which a vehicle of this kind is subjected it is desirable to provide equalized three-point suspension for the body. Otherwise it would be excessively racked, or if sufficiently strong it would throw excessive strains upon the body mountings. Two of the three points of support are found in the pair of hinges 14. The other point of suspension is located at the front of the body and will be considered hereinafter.

The body has a rear door 17 supported at its upper edge by hinges 18 and held closed by latches 19 engaging its lower edge. The latches 19 are operated by rods 20 and a hand lever 21, the linkage center being such that the latches are securely held in door-engaging position. The lever 21 is mounted on the front end of the body accessible to the driver in the cab. Preferably the door is made leakproof by a rubber gasket strip to prevent liquid material from spilling on the streets.

Means is provided for loading the body, in the present instance from the rear end of the vehicle. Because of roadway clearances required a rear-loading vehicle is sometimes more convenient than a side-loading vehicle. As illustrated, a bucket 25 is pivoted by pins 26 upon the outer ends of arms 27 oscillatable about journals 28 secured to the sides of the body. The arms 27, when the bucket is in its lowermost position convenient for loading by attendants, lie upon side rests 29 attached to the body. Preferably rubber pads 30 or equivalent buffers are disposed between the arms and the side rests.

The bucket itself is approximately the full width of the body to enable it to accommodate a large load at each trip. The bucket both when empty and when loaded tends to swing upright on its pivots and the centers are such that there is some tendency to swing slightly in a clockwise direction from the position in which it occupies in Figure 1; stop lugs 31 acting between the ends of the bucket and the support arms therefor hold the bucket at a definite angle with the arms.

As will be apparent from Figure 6 the bucket is adapted to be swung above the body to empty its contents into the top thereof. The top opening into which the bucket dumps is normally covered by a closure 35 (Figs.

2 and 6) mounted at its front edge by hinges 36 upon the body.

The closure is opened for the bucket by push rods 37 pivoted at one end to ears 38 of the closure and guided at the other end by guide strips 39 formed on a radius about the arm journals 28. The push rods have projections or rollers 40 to retain them to the strips and the arms 27 have abutments 41 to engage the guided ends of the push rods to raise the closure. The closure returns by gravity. The action of the closure operating means will be obvious from Figures 1, 2 and 6.

The upper edges of the ends of the bucket are extended as at 25a to better retain material and are rounded to act against the closure 35 in case it does not fully clear the bucket. Further to retain the elevated material as the bucket is dumping, the closure is formed with end walls 43 which close the angular space between closure and body when the closure is raised.

The means for dumping the bucket comprises trips 45 having rolls 46 on the body adjacent the top opening and lugs 47 on the ends of the bucket cooperable therewith. Forks 48 may be provided on the lugs 47 to embrace the rolls 46.

The means for raising and lowering the bucket should be as simple and rugged as possible so as to avoid complicated controls to be manipulated on the one hand and breakage and improper operation on the other hand. The mechanism herein provided fulfills these requirements. It gives entire control both of the raising of the bucket and of the raising of the body by a single manual control—assuming the power take off shaft is operating. It avoids the use of all reverse mechanisms which are noisy and troublesome. It operates satisfactorily regardless of body-weave. It moves the bucket rapidly at the middle portion of its upward and downward stroke and slowly at the ends of its stroke. It maintains positive control of the bucket at all times.

With these considerations uppermost, the bucket raising mechanism comprises links 50 attached to the bucket-raising arms 27 by pivot pins 51. At their upper ends the links 50 are pivoted to laterally protruding pins 52 secured to endless chains 53 passing over spaced sprockets 54 and 55, one of which—55 in the present instance—is fixed on a transverse power driven shaft 56. The length of the chains 53 is such as to give the bucket its required travel from its lower position as shown in Figure 1 to its upper position as shown in Figure 6.

Adjustment to tighten the chains is provided by mounting the lower sprockets 54 on sliding blocks 57 retained upon the body by bolts 58 in slots 59 of the blocks and adjusted by tension bolts 60 secured to flanges 61 on the blocks and 62 on the body respectively.

Figure 2:
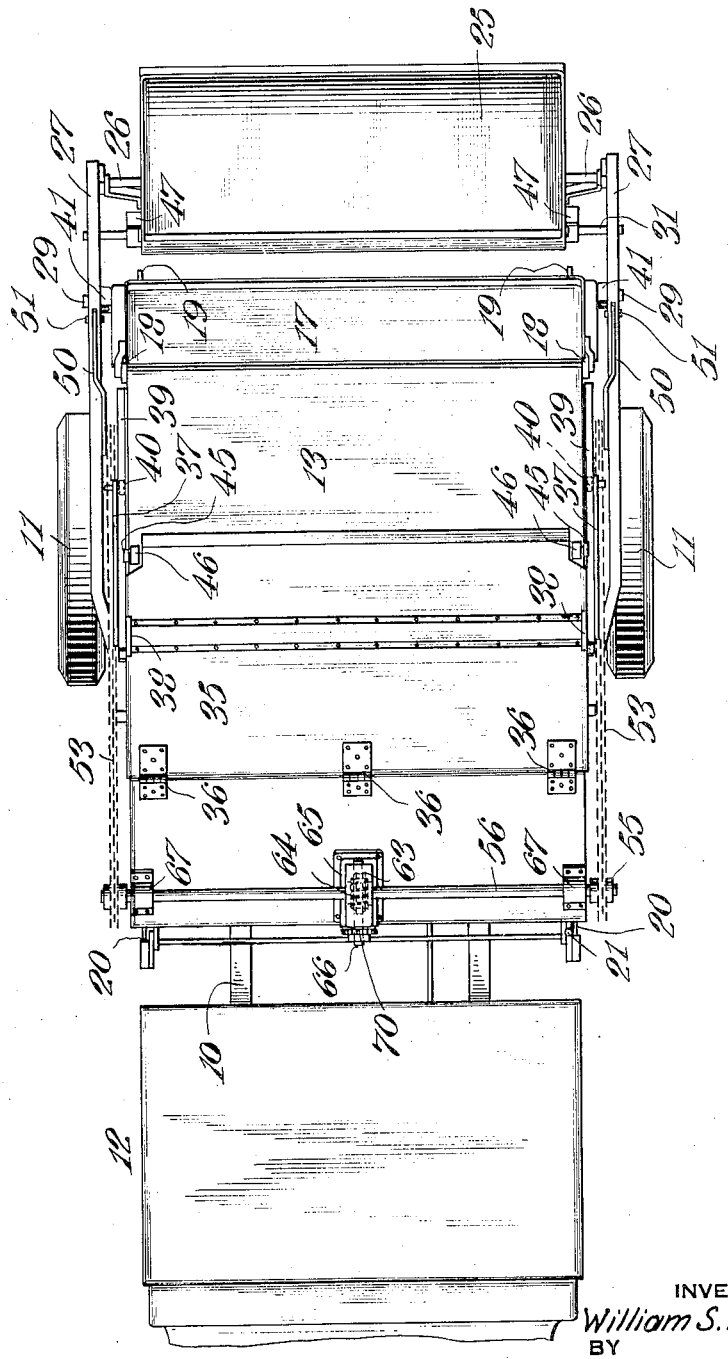
Figure 2 is a top plan view.
Figure 3:
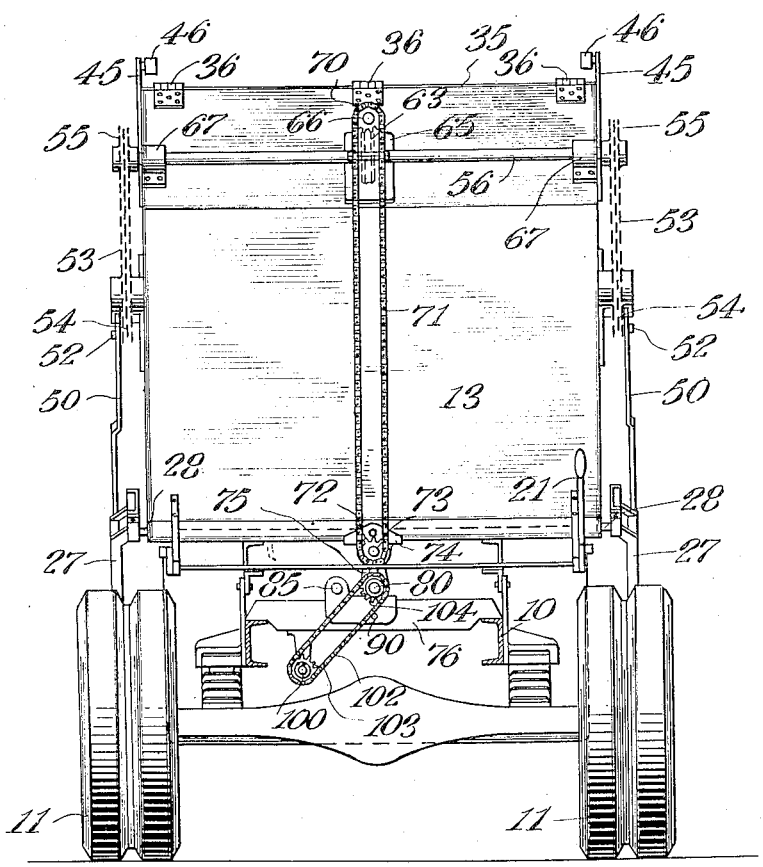
Figure 3 is a front elevation taken between the body and driver's cab.

Referring to Figures 1 and 3, the transverse shaft 56 is driven by meshing worm gears 63 and 64 operating within a gear housing 65 and keyed to the transverse shaft 56 and a stub shaft 66 respectively. Both the shafts 56 and 66 have bearings in the gear housing and in addition the transverse shaft 56 has further end bearings 67 secured upon the body near the sprockets 55 to take the weight of the bucket and related parts.

The stub shaft 66 is provided with a sprocket wheel 70 which is driven by a sprocket chain 71 from a sprocket wheel 72 fast on a loader-drive shaft 73 mounted in a bearing bracket 74 at the mid-front and bottom of the body.

When the body is down as shown in Figure 3, the cylindrical bearing portion of the bearing bracket 74 is adapted to rest in a support chair 75 secured to a cross-beam 76 of the chassis. As shown in Figures 4 and 5 an open fork 77 serves to guide the parts into proper relation when the body is lowered.

The rear end of the shaft 73 is provided with a gear 78 adapted to be put in mesh with a shiftable gear 79 splined to a jack shaft 80. As seen in Figure 5 the jack shaft 80 is mounted in a bearing 81 formed in the chair 75 and an aligned bearing 82 supported on a transverse chassis beam 83. At one side of the jack shaft 80 there is mounted a body-lift shaft 85 provided with a fixed gear 86 spaced behind the gear 78 by somewhat more than the thickness of the shiftable gear 79 so that the latter may by shifting along its shaft 80 be thrown into mesh either with gear 78 to drive the bucket operating mechanism or with the gear 86 to drive the body lift mechanism.

The shiftable gear 79 is moved along its shaft by a yoke 87 engaging the groove of a collar 88 of the gear 79. The yoke is pinned at 89 to a shift rod 90 operating in suitable guide bores and the rod is actuated as desired by a manual control rod 91 extending to some point convenient for control by the driver in the cab. It is here to be noted that the teeth of gears 79 and 78 are made sufficiently pointed to slip past each other in case the body with gear 78 should be lowered while gear 79 stood in its path.

It is immaterial to the present invention what kind of body hoist is employed and whether it be hydraulic or mechanical. A coupling 93 is shown on the end of shaft 85 for driving a pump if a hydraulic hoist is used or suitable gears if a mechanical hoist is used. To explain the parts illustrated in Figure 1, a hydraulic plunger 94 having a roller 95 operates upon a curved segment 96 to raise the body.

It will be seen that the third point of support for the body comprised by the bearing of jack shaft 80 resting in the fork 77 is so chosen that the gears 78 and 79 on the body and chassis respectively will mesh properly no matter how much the body and chassis may weave, for the center of body movement will always be about the center of the shaft on which the gear 78 is fixed. Heretofore vertical shafts on the front end of the body have been provided with clutches, castellated plates and other couplings but much trouble has been experienced with them. They have required cushion springs and other aids and even then they did not always meet properly or operate correctly at all times. The present device gives a dependable connection between body and chassis and relieves these difficulties.

If conditions permit, the jack shaft 80 may be driven directly by a power-take-off shaft but most of present truck constructions do not permit of this without having too great an angle at the universal joints in the power-take-off shaft. Consequently, there is provided a lay shaft 100 mounted in depending bearing pedestals 101, which shaft drives the jack shaft 80 by a sprocket chain 102 and sprockets 103, 104 fast on the lay shaft 100 and jack shaft respectively. The lay shaft 100 is connected with the power-take-off shaft 105 by a universal-joint 106. It is to be understood that the power-take-off shaft may be geared and controlled to run or be stopped at will, regardless of the operation of the vehicle along the road.

It is believed that the operation of all parts of the apparatus will be apparent from the detailed description given above without further explanation. The views showing the various positions of parts is intended to make this clear. It may be mentioned, however, that, as shown in Figure 7, the bucket 25 is usually elevated midway between its loading and emptying positions (where, of course, it will remain on account of the non-back-drive worm gearing used) when the body is tilted for dumping in order to get the bucket clear of the ejected material and the rear door of the body.

The benefits and advantages of the invention also will be apparent to those skilled in the art to which the invention relates. While the invention has been described and claimed with special reference to a self-loading truck it will be apparent that some of its features apply equally well to other types of vehicles having driven mechanism on a tiltable or shiftable body. The description of one embodiment has been given for illustration merely and is not intended to limit the scope of the invention.

What I claim is:

1. In a self-loading vehicle in combination, an enclosed material-receiving body having a filling opening therein, a hinged closure covering said opening, a vertically swingable loading bucket, bucket-supporting arms pivoted on said body, a push rod pivoted at one end to said closure and at the other end slidable in an arcuate guideway concentric with the center of oscillation of said bucket-supporting arms, and means on said arms for engaging said push rod to raise said closure as the bucket approaches said filling opening.

2. In a self-loading vehicle in combination, an enclosed material-receiving body, a vertically swingable bucket for loading the body by an opening in the top thereof, arms pivoted to said body and pivotally supporting said bucket off its center of gravity either when empty or loaded, cooperating means between said bucket and arms for maintaining the same relative position between them as the bucket is raised to tilt said bucket toward said opening, and means cooperating between said bucket and body to tilt said bucket to cause it to empty its contents into said top opening as the bucket completes its upward travel.

3. In a motor vehicle in combination, a chassis, a tiltable body mounted thereon, an arm-supported bucket mounted for movement between a lower position where it is filled and an upper position where it is emptied into the body, and means for raising and lowering the bucket, said means including an orbit-travelling power device and means connected to a bucket-supporting arm and to a point on said device for raising and lowering said bucket by uni-directional movement of said device.

4. In a motor vehicle in combination, a chassis, a tiltable body mounted thereon, an arm-supported bucket mounted for movement between a lower position where it is filled and an upper position where it is emptied into the body, and means for raising and lowering the bucket, said means operating in one direction without reversing to move the bucket in both directions, said means comprising an endless flexible device supported on said body and attached to a bucket-supporting arm.

5. In a motor vehicle in combination, a chassis, a tiltable body mounted thereon, an arm-supported bucket mounted for movement between a lower position where it is filled and an upper position where it is emptied into the body, and means for raising and lowering the bucket, said means operating in one direction without reversing to move the bucket in both directions, said means comprising an endless flexible device supported on spaced pulleys on said body and connected to a bucket-supporting arm, and means for driving one of said pulleys on the body from a power shaft on the chassis.

6. In a self-loading vehicle in combination, a chassis, a power shaft on said chassis, a tiltable body, a loader movably mounted on said body, and means to operate said loader on the tiltable body from said power shaft on the chassis, said means comprising cooperative driving and driven members connected respectively with said chassis and with said tiltable body, one of said members being cylindrical with its center approximately at the center of weave of the body on the chassis, a single support aligned with said cylindrical member supporting one end of the body whereby the body weave may not disturb the effectiveness of the driving connection.

7. Apparatus as set forth in claim 6 in which said members comprise spur gears mounted on approximately horizontal shafts.

8. Apparatus as set forth in claim 6 in which said members comprise spur gears one of which is slidable along a shaft mounted on the chassis so as to be thrown in and out of mesh with its cooperating member which is mounted on the body.

9. Apparatus as set forth in claim 6 in which said members comprise spur gears one of which is slidable along a shaft mounted on the chassis so as to be thrown in and out of mesh with its cooperating member which is mounted on the body, and means within control of the driver in the cab of the vehicle for connecting and disconnecting said gears.

10. In a self-loading vehicle in combination a chassis, a tiltable body hinged at two points at its rear end upon said chassis and supported at a third point at the center of its front end, said front-end support comprising a shaft bearing and cylindrical chair for said bearing mounted on said body and chassis so as to separate when the body is tilted, driving means on said chassis, driven means on said body, a shaft in said bearing, a shaft on said chair and means for operatively engaging said shaft when the body is in lowered position to connect said driven means on the body with the driving means on the chassis.

11. In a motor vehicle, in combination, a chassis, a tiltable body mounted thereon, an arm-supported bucket mounted for movement between a lower position where it is filled and an upper position where it is emptied into the body, and means for raising and lowering the bucket, said means operating in one direction without reversing to move the bucket in both directions, said means comprising an endless flexible device supported on said body and attached by a rigid link to a bucket supporting arm whereby the bucket is positively moved in both directions while the flexible device is moving consistently in one direction.

12. In a self-loading vehicle in combination, a chassis, a cargo body mounted thereon, a body loading device mounted for movement reversely along one and the same path from a position near the ground to an elevated position for depositing material in said body, and means for operating said loading device from power means on the vehicle, said operating means including an orbit travelling element, and rigid members connecting said loading device to said orbit travelling element whereby the loading device is positively moved by said element in both directions of travel.

In testimony whereof I have signed my name to this specification this 10th day of September, 1929.

WILLIAM S. HOWARD.